United States Patent [19]
Wildmoser et al.

[11] 3,926,591
[45] Dec. 16, 1975

[54] REGENERATION OF SCRUBBING AGENT USED FOR THE REMOVAL OF $CO_2$ AND $H_2S$ FROM GASES CONTAINING POLYMERIZABLE HYDROCARBONS

[75] Inventors: Alfred Wildmoser, Haar; Erich Dannhorn, Munich, both of Germany

[73] Assignee: Linde Aktiengesellschaft, Wiesbaden, Germany

[22] Filed: Dec. 6, 1973

[21] Appl. No.: 422,562

[30] Foreign Application Priority Data
Dec. 6, 1972  Germany.............................. 2259803

[52] U.S. Cl. ........................ 55/68; 55/73; 423/229; 423/233
[51] Int. Cl.[2] .................. B01D 50/00; B01D 53/14
[58] Field of Search............ 55/68, 73; 260/681.5 R; 423/229, 232, 233, 234

[56] References Cited
UNITED STATES PATENTS

| | | | |
|---|---|---|---|
| 2,886,405 | 5/1959 | Benson et al. ................... | 423/233 X |
| 3,101,996 | 8/1963 | Bresler et al. ....................... | 423/229 |
| 3,492,788 | 2/1970 | Hochgesand et al. .............. | 55/68 X |
| 3,598,881 | 8/1971 | Kniel et al. ................ | 260/681.5 R X |
| 3,793,434 | 2/1974 | Leder............................. | 423/232 X |

*Primary Examiner*—Charles N. Hart
*Assistant Examiner*—Robert H. Spitzer
*Attorney, Agent, or Firm*—Millen, Raptes & White

[57] ABSTRACT

A system for the purification of a gas containing a thermally polymerizable diolefin, e.g., propadiene, and at least one acidic component such as carbon dioxide or hydrogen sulfide, by:
a. scrubbing a gas such as a cracked hydrocarbon gas, with normally liquid, alkaline, heat-regenerable scrubbing agent such as an aqueous solution of triethanolamine;
b. extracting the loaded scrubbing agent with a liquid hydrocarbon solvent to remove a substantial portion of diolefin, and separating the resultant diolefin-loaded hydrocarbon solvent from the loaded scrubbing agent, the latter containing residual diolefin;
c. thermally regenerating the loaded scrubbing agent in a regenerating column to form a gaseous overhead containing the acidic component and residual diolefin, and a bottom liquid of regenerated scrubbing agent; and
d. cooling the gaseous overhead to form a condensate containing said residual thermally polymerizable diolefin, and preventing resultant condensate from being refluxed into said regenerating column, thereby mitigating the extent of polymerization of said thermally polymerizable diolefin within said regeneration column, and recycling the condensate to the loaded scrubbing agent prior to the extraction thereof with hydrocarbon solvent.

7 Claims, 1 Drawing Figure

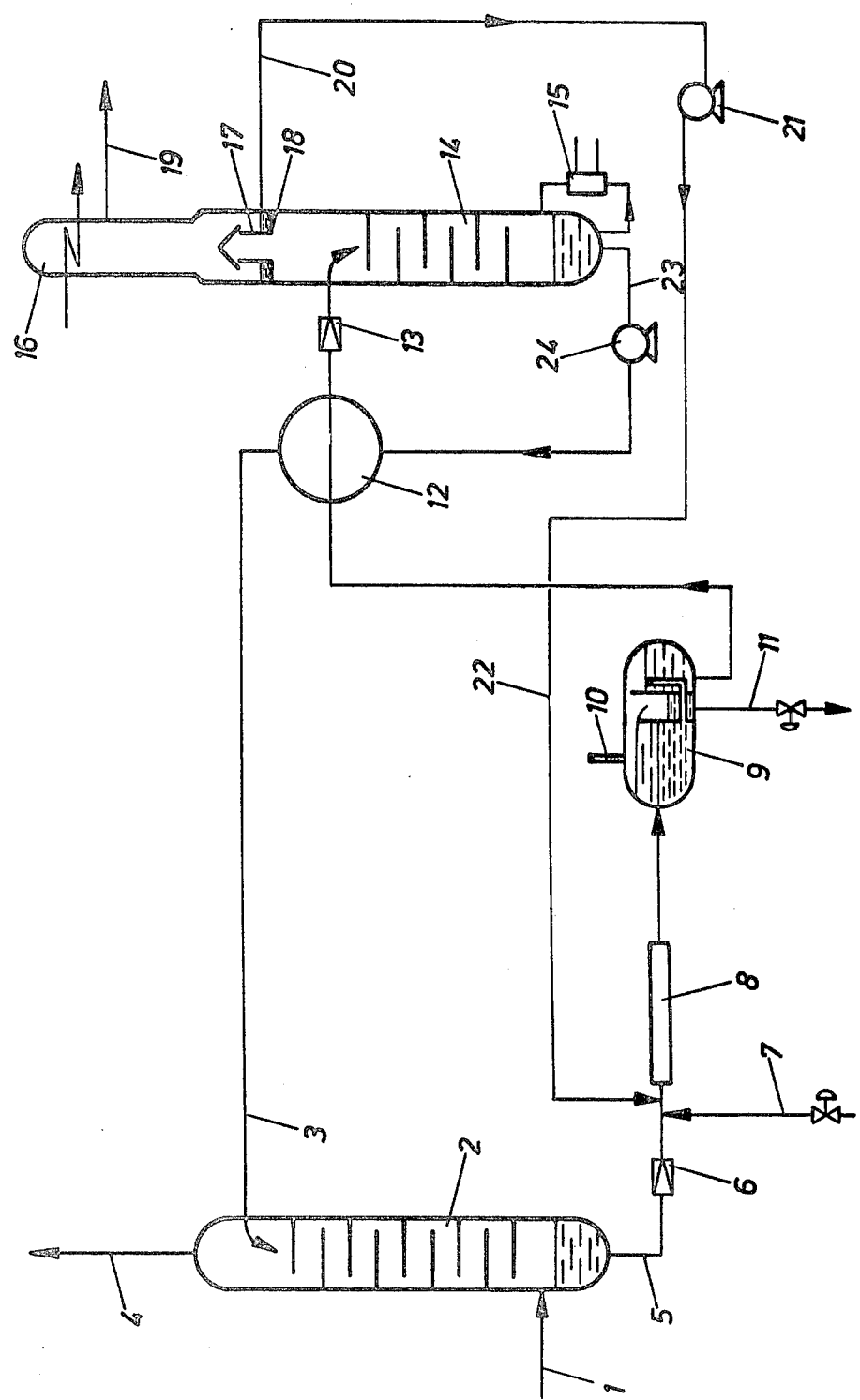

REGENERATION OF SCRUBBING AGENT USED FOR THE REMOVAL OF CO₂ AND H₂S FROM GASES CONTAINING POLYMERIZABLE HYDROCARBONS

CROSS REFERENCE TO RELATED APPLICATIONS

This application is related to application Ser. No. 309,264 filed Nov. 24, 1972 and application Ser. No. 320,171 filed Jan. 2, 1973, both divisional applications of abandoned patent application Ser. No. 36,082 filed May 11, 1970, all of said applications being owned by the owner of the present application.

BACKGROUND OF THE INVENTION

This invention relates to a process and apparatus for the scrubbing of $CO_2$ and/or $H_2S$, as well as further acidic compounds if they are present, from gases containing unsaturated hydrocarbons and is directed especially to the regeneration of the scrubbing agent. In particular, the invention relates to an improvement in a known scrubbing system based on a thermally regenerable alkaline scrubbing agent and wherein a portion of thermally polymerizable hydrocarbon components absorbed by the scrubbing agent is extracted with a hydrocarbon solvent, prior to the thermal regeneration of the scrubbing agent. A phase separator such as a settler or the like is employed to separate the aqueous scrubbing agent from the hydrocarbon phase.

In the pyrolysis of ethane, propane, naphtha, gas oil, and other suitable starting materials for the production of olefins, the resultant cracked gases contain not only acidic impurities, such as, for example, $CO_2$, $H_2S$, and traces of COS, but also diolefins, such as, for example, propadiene, butadiene, cyclopentadiene, and similar dienes. During the course of the purification of these cracked gases for the subsequent manufacture of ethylene, propylene, etc., the acidic components are generally removed by a scrubbing step. Suitable conventional scrubbing agents for this purpose include but are not limited to sodium hydroxide solution, potassium hydroxide solution, aqueous solutions of potash or aliphatic amines, such as, for example, mono-, di-, and triethanolamine, or an aqueous solution of the potassium salt of N-methylaminopropionic acid. All of these scrubbing agents are heat-regenerable, i.e., the adsorbed acidic components can be driven out of the scrubbing agents again by heating and/or distillation, so that the scrubbing agents can be recycled to the scrubbing step.

It is known, however, that these scrubbing agents absorb, in addition to the desired acidic components, also a deleterious quantity of thermally polymerizable unsaturated hydrocarbons, such as, for example, propadiene, butadiene, or cyclopentadiene, which, when the scrubbing agent is treated in the regeneration stage, tend to polymerize and precipitate out in the regenerating column itself, and especially on the heat exchange surfaces of the forced-circulation heaters of such regenerating columns which ultimately result in the fouling of said heaters. This makes it necessary to shut down and clean the regeneration column and accessory parts at relatively frequent intervals.

In order to overcome this disadvantage, it has been suggested (U.S. Pat. No. 3,598,881) to admix a hydrocarbon solvent, for example benzene or toluene, to the loaded scrubbing agent discharged from the scrubbing column in order to extract the polymerization-prone substances dissolved or emulsified in the alkaline scrubbing agent. After a phase separation in a separator, the alkaline scrubbing agent, which has been substantially freed of polymerization-prone components, is fed to a regenerating column, whereas the hydrocarbon solvent is, in part, discarded and, in part, worked up by distillation and recycled into the process.

However, even with this known procedure, owing to the distribution coefficient existing between the hydrocarbon phase and the aqueous phase, it is not possible to keep all the polymerization-prone substances away from the regenerating column; consequently this process also meets with the same problems, albeit less frequently, due to polymer formation, thus requiring the shut down of the plant.

SUMMARY

Bearing in mind the above drawbacks of conventional processes, it is an object of the present invention to provide a process and apparatus which results in less polymer formation during thermal regeneration.

Upon further study of the specification and appended claims, other objects and advantages will become apparent.

To attain these objects, the process aspect of this invention is described as follows:

In a process for the purification of a gas containing thermally polymerizable diolefin and at least one acidic component selected from the group consisting of carbon dioxide and hydrogen sulfide, which process comprises:

a. scrubbing said gas with normally liquid, alkaline, heat-regenerable scrubbing means capable of removing the acidic components and dissolving at least a portion of said polymerizable diolefin to form loaded scrubbing means containing said acidic component and said polymerizable diolefin;

b. contacting said loaded scrubbing means with liquid hydrocarbon solvent to extract out a major quantity, but less than 100% of said thermally polymerizable diolefin, and separating resultant loaded hydrocarbon solvent from resultant loaded scrubbing means; and c. thermally regenerating said resultant loaded scrubbing means in a regenerating column to form a gaseous overhead containing said acidic component and residual thermally polymerizable diolefin, and regenerated scrubbing means, the improvement wherein said gaseous overhead is cooled to form a condensate containing said residual thermally polymerizable diolefin, and preventing resultant condensate from being refluxed into said regenerating column, thereby mitigating the extent of polymerization of said thermally polymerizable diolefin within said regeneration column.

In a preferred embodiment, resultant condensate is recycled to the loaded scrubbing agent prior to the extraction thereof with hydrocarbon solvent.

DETAILED DISCUSSION

In the process of the present invention, the gas containing polymerization-prone substances, such as propadiene, butadiene and/or cyclopentadiene, is scrubbed, in order to remove the acidic components contained therein, such as $CO_2$, $H_2S$, and COS, in a scrubbing column with an alkaline scrubbing agent, such as aqueous potash solution, sodium hydroxide solution, potassium hydroxide solution, aqueous solutions of mono-, di- or triethanolamine, or an aqueous solution of the potassium salt of N-methylaminopropionic acid. During this step, the acidic components and also, to a certain extent, the polymerizable components, are dissolved out of the gas. Then, a hydrocarbon solvent, such as benzene or toluene or, which proved to be particularly simple and expedient, cracked benzine, is added to the loaded scrubbing agent exiting from the scrubbing column, and the mixture is fed, depending on the type and character of the scrubbing agent and of the hydrocarbon solvent, to a mixing zone, an extraction column, and subsequently to a separator, or merely to a separator, wherein the mixture is split into an aqueous phase and into a hydrocarbon phase. The hydrocarbon phase is withdrawn from the separator and depending on the economics, is either discarded or fed to a distillation stage.

The separated aqueous alkaline scrubbing agent phase (which contains a small amount of dienes and polymers which amounts vary widely depending on starting materials and operating conditions, but, in general, a concentration of about 0.003 to 0.03%, by weight of dienes and of about 0.01 to 0.1%, by weight of polymers is common) is then heated in any suitable manner, for example in indirect heat exchange with regenerated scrubbing agent, and passed to a regenerating column. The regenerating column is equipped with several rectification plates and is provided at its sump with a heating unit and at its head with a condenser. The sump heating unit which can be constructed, for example, as a forced-circulation heater, serves to heat the scrubbing agent and drive out the acidic components dissolved therein, namely $CO_2$, $H_2S$ and in some cases COS. In this way, the scrubbing agent is sufficiently regenerated so that it can be recycled to the scrubbing column. The regeneration temperature depends on the particular scrubbing agent employed, but will generally vary from 95° to 120°, especially 105° to 115°, the preferable regeneration temperature depending on the desired pressure of the sour gases and the concentration of the scrubbing agent.

According to the invention, the regenerating column has a condenser at its upper end, which condenser can be arranged within or outside of the column and which is provided with a collecting device for downwardly flowing condensate.

In case of an internally disposed condenser, the regenerating column is suitably equipped in its upper section, below the cooling unit, with a vapor flue and with a collecting trough for condensate dripping down from the cooling unit. Independently of the manner in which it is constructed, the condenser provided with the collecting means must be designed so as: (a) to effect a partial condensation of the vapors rising in the column; and (b) to prevent the resultant condensate from refluxing into the column.

This condenser design is based on the realization that the vapors rising in the regenerating column, especially in case of a scrubbing agent such as monoethanolamine, contain a considerable amount of hydrocarbons and that the phenomenon of the polymerization of polymerizable substances (observed in such columns in spite of the separation of scrubbing agent phase and hydrocarbon phase) is due to the fact that these substances are condensed by the cooling coils of the head condenser irrespective of the fact that the intended and main function of the condenser is to condense scrubbing agent vapors so that the scrubbing agent can be refluxed into the column. The present invention, in contrast, provides a trap for the polymerization-prone substances so that they are not returned to the regeneration column. The condenser of the present invention is sufficiently cold to cool down the condensate to at least 50°C, preferably down to at least 35°C. The composition of the resultant condensate will vary according to starting materials and operating conditions, but, in general, it is common to find that the condensate analyzes on a percent by weight basis about 0.1 to 1.5% scrubbing agent, about 0.04 to 0.4% dienes, and about 0.5 to 5% other hydrocarbons.

In accordance with the preferred embodiments of this invention, the condensate is continuously pumped off and admixed to the loaded scrubbing agent before the latter is extracted with hydrocarbon solvent. In this way, it is possible to operate practically loss-free with respect to the alkaline scrubbing agent and the hydrocarbon solvent, since both materials are recycled into the process.

According to another embodiment of this invention, it is also possible to produce the solvent necessary to extract the polymerization-prone components, from the raw gas itself, if the preconditions therefor exist in the raw gas. This is done by subjecting the cracked gas, during the course of the stepwise cooling thereof downstream of the cracking furnace, to a partial condensation so that a sufficient quantity of substantially nonpolymerizable hydrocarbons, for example a fraction rich in aromatics, is condensed out in order to be able to dissolve the polymerization-prone substances. In this case, one can omit the admixture of an externally provided hydrocarbon solvent to the loaded scrubbing agent.

According to another embodiment, the phase separation can be conducted, in the process of this invention, in the sump of the scrubbing column itself, so that a separate and distinct separator for the phase separation can be omitted.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

DESCRIPTION OF EMBODIMENT IN DRAWING

Referring now to the drawing which is a schematic illustration of a preferred embodiment of the invention, a scrubbing column 2 is fed, via conduit 1, with 140,000 $Nm^3/h$. of a gas having the following composition:

| Component | % by Weight |
|---|---|
| $H_2$ | 1.14 |
| CO | 0.41 |
| $CO_2 + H_2S$ | 0.07 |
| $CH_4$ | 22.30 |
| $C_2H_2$ | 0.67 |
| $C_2H_4$ | 36.97 |
| $C_2H_6$ | 7.34 |
| $C_3H_4$ | 0.51 |
| $C_3H_6$ | 14.90 |
| $C_3H_8$ | 0.47 |

-continued

| Component | % by Weight |
|---|---|
| C₄H₆ | 4.33 |
| C₄H₈ | 5.11 |
| C₄H₁₀ | 0.53 |
| Cyclopentadiene | 0.80 |
| C₅₊ | 2.20 |
| Aromatics (benzene, toluene, xylene) | 2.25 |

A pressure of 17 atmospheres absolute is ambient in the scrubbing column, and a temperature of about 35° C. is maintained. The gas fed via conduit 1 is conducted countercurrently against 18 tons/h. of an aqueous, approximately 15% solution of monoethanolamine, which is introduced to the head of the scrubbing column 2 via conduit 3 and has a temperature of about 35° C. The gas, freed from acidic components except for a residue of 50 p.p.m., leaves the scrubbing column 2 at the top via conduit 4. The scrubbing agent loaded with the acidic components, which also contains absorbed diolefins from the gas, exits from the scrubbing column 2 via conduit 5 and is expanded in valve 6 to a pressure of 5 atm. abs. Through conduit 7, 2 tons/h. of cracked benzine (pyrolysis gasoline), rich in aromatics, is added to the scrubbing agent. The mixture then enters an extraction zone 8 where the diolefins are substantially extracted out of the scrubbing agent by the cracked benzine.

The mixture is thereafter conducted into a separator 9; the separation of the aqueous phase and the hydrocarbon phase is effected in the up stream side of this separator. Gases liberated during the expansion in valve 6 can escape via a conduit 10. The hydrocarbon phase, being the lighter phase, rises upwardly, and flows over a separating plate, and is collected in the middle portion of the separator 9. From there, this phase passes through conduit 11 either to waste or to an oil scrubbing column not illustrated in the drawing. The aqueous scrubbing agent phase passes from the up stream portion of the separator via a conduit into the down stream portion.

The scrubbing agent is then heated in heat exchanger 12 countercurrently to regenerated scrubbing agent to a temperature of 90°C., expanded in valve 13 to a pressure of about 1.5 atm. abs., and is then passed into a regenerating column 14 which is under a pressure of 1.4 atm. abs. The regenerating column 14 is equipped at the base with a forced-circulation heater 15, operated with 3 tons/h. of steam, and at the head with a condenser 16 operated with cooling water. The regenerating column also has a vapor flue 17 and a collecting trough 18. The scrubbing agent entering the regenerating column 14 releases the acidic components dissolved therein while flowing downwardly over the rectifying plates and under the effect of the sump heater, reboiler 15, the latter maintaining a temperature of 110° C. in the interior of the regenerating column. The acidic components then are withdrawn at the top through the vapor flue 17. Simultaneously, hydrocarbon vapors are liberated in the regenerating column 14, which are likewise discharged at the top via the vapor flue 17. A portion of these hydrocarbon vapors remains in the gaseous phase, so that there are discharged via conduit 19, in addition to 70 Nm³/h. of CO₂, H₂S, and COS, 30 Nm³/h. of hydrocarbons. A considerable portion of the rising hydrocarbons, however, is condensed on the condenser 16 and flows into the collecting plate 18, from where it is withdrawn via conduit 20 with a temperature of 80° C.

The efflux from the condenser contains 2.7 tons/h. of water and 3.4 kg./h. of monoethanolamine and contains hydrocarbons and diolefins, the amounts of which vary with the operating conditions. This efflux is conveyed, with the aid of pump 21, via conduit 22 to a point upstream of the extraction zone 8. The regenerated scrubbing agent leaves the regenerating column 14 via conduit 23 and is recycled, with the aid of pump 24 through the heat exchanger 12, where it is cooled to about 35°C., and the resultant cooled scrubbing agent is then passed via conduit 3, to the head of the scrubbing column 2.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the purification of gas containing a major portion of hydrocarbon, a thermally polymerizable diolefin and at least one acidic component selected from the group consisting of carbon dioxide and hydrogen sulfide, which process comprises:
   a. scrubbing said gas with normally liquid, alkaline, heat-regenerated scrubbing means capable of removing the acidic component and dissolving at least a portion of said polymerizable diolefin to form loaded scrubbing means containing said acidic component and said polymerizable diolefin;
   b. contacting said loaded scrubbing means with liquid hydrocarbon solvent to extract out a major quantity, but less than 100% of said thermally polymerizable diolefin, and separating resultant loaded hydrocarbon solvent from resultant hydrocarbon treated loaded scrubbing means; and
   c. thermally regenerating said resultant hydrocarbon treated loaded scrubbing means in a regenerating column to form a gaseous overhead containing said at least one acidic component and residual thermally polymerizable diolefin, and a bottoms of regenerated scrubbing means,
   the improvement wherein said gaseous overhead is cooled to form a condensate containing said residual thermally polymerizable diolefin, and preventing resultant condensate from being refluxed into said regenerating column thereby mitigating the extent of polymerization of said thermally polymerizable diolefin within said regeneration column and wherein said condensate is recycled to the loaded scrubbing means immediately prior to the contacting thereof with said hydrocarbon solvent.

2. A process as defined by claim 1 wherein said thermally polymerizable diolefin is propadiene, butadiene, cyclopentadiene or mixtures thereof.

3. A process as defined by claim 2 wherein the thermal regeneration is conducted at 95° C to 120° C.

4. A process as defined by claim 3 wherein said condensate is cooled down to at least 50° C.

5. A process as defined by claim 4 wherein said scrubbing means is an aqueous solution of potash, sodium hydroxide, potassium hydroxide, mono-, di-, or triethanolamine, or an aqueous solution of the potassium salt of N-methylaminopropionic acid.

6. A process as defined by claim 1 wherein the thermal regeneration is conducted at 95° C to 120° C.

7. A process as defined by claim 6 wherein said condensate is cooled down to at least 50° C.

* * * * *